United States Patent [19]

Bonebright et al.

[11] Patent Number: 4,928,109

[45] Date of Patent: May 22, 1990

[54] MODULATED SCANNING ANTENNA

[75] Inventors: Mark E. Bonebright, La Mesa; Paul R. Eberhardt, Encinitas; John C. Alley, San Diego, all of Calif.

[73] Assignee: Cubic Defense Systems, Inc., San Diego, Calif.

[21] Appl. No.: 257,691

[22] Filed: Oct. 14, 1988

[51] Int. Cl.[5] .......... H01G 13/02

[52] U.S. Cl. .......... 343/786; 343/777; 343/787

[58] Field of Search .......... 343/757, 777, 786, 787, 343/783, 772

[56] References Cited

U.S. PATENT DOCUMENTS

| | | | |
|---|---|---|---|
| 2,994,084 | 7/1961 | Miller | 343/783 |
| 3,004,259 | 10/1961 | Shanks et al. | 343/787 |
| 3,007,165 | 10/1961 | Engelbrecht | 343/754 |
| 3,021,524 | 2/1962 | Kompfner | 343/781 |
| 3,475,757 | 10/1969 | Parris | 343/777 |
| 3,573,838 | 4/1971 | Ajioka | 343/781 |
| 4,338,609 | 7/1982 | Landry | 343/787 |
| 4,387,378 | 6/1983 | Henderson | 343/854 |
| 4,491,845 | 1/1985 | Rothenberg | 343/754 |
| 4,574,289 | 3/1986 | Henderson | 343/786 |

*Primary Examiner*—Rolf Hille
*Assistant Examiner*—Doris J. Johnson
*Attorney, Agent, or Firm*—Brown, Martin, Haller & McClain

[57] ABSTRACT

A scanning antenna comprises a non-magnetic, electrically conductive radiation horn defining an antenna opening having a predetermined central line of focus, and at least one magnetically switchable conductive element such as a reed relay mounted to extend across the antenna opening perpendicular to and spaced from the central line of focus. A magnetic field generator such as an electromagnet is positioned to generate a magnetic field to control switching of the conductive element between its conductive and non-conductive states, and a control circuit controls operation of the magnetic field generator.

10 Claims, 2 Drawing Sheets

FIG. 1
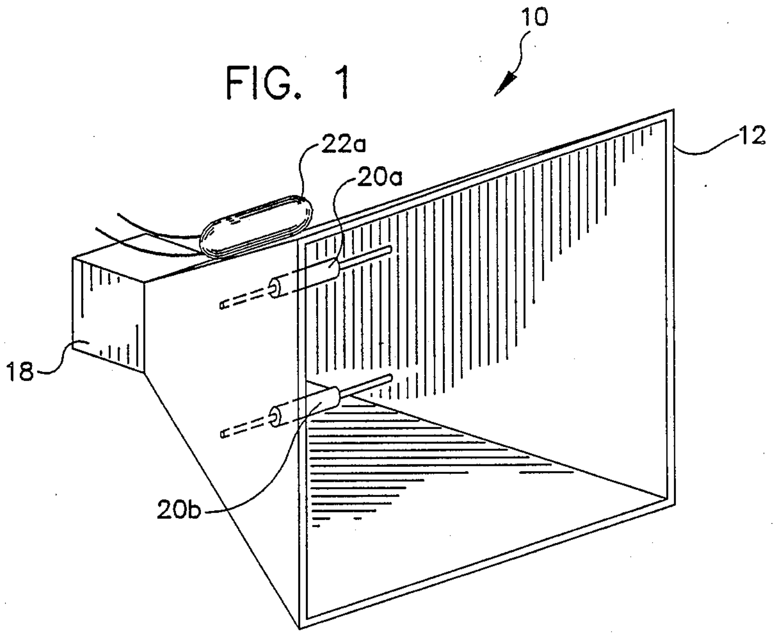
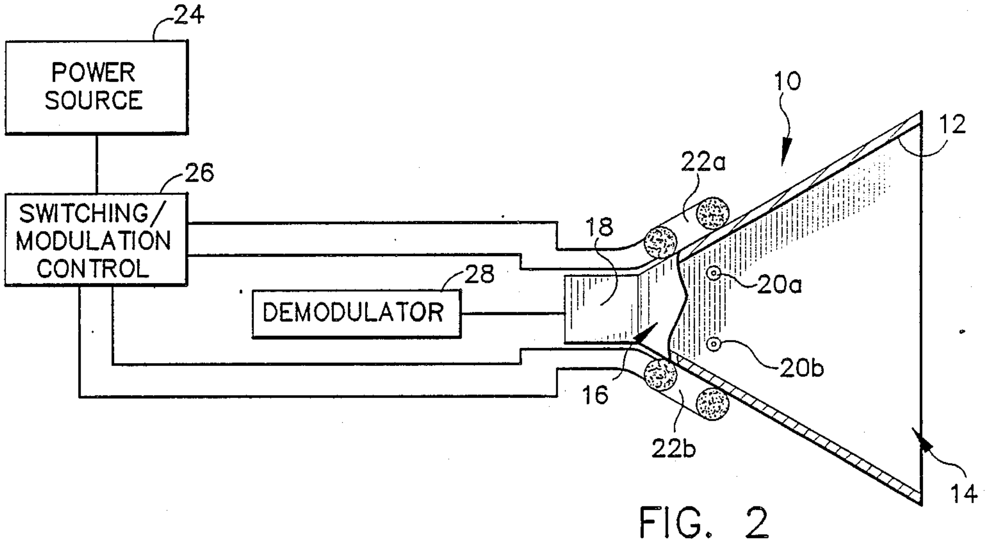
FIG. 2

MODULATED SCANNING ANTENNA

BACKGROUND OF THE INVENTION

1. Field of the Invention

The present invention relates to antennas and more particularly to an apparatus and method for scanning a high frequency antenna across a predetermined field of view. The invention further relates to a scanning antenna utilizing a series of magnetically modulated current shunts to alter the phase center of a horn type antenna for tracking a moving signal source.

2. Background

There has been an ongoing need to develop antennas capable of scanning a field of view for receiving signals. In some applications the signals are received from different sources having differing positions within a predefined field of view. In other applications, signals are detected or received from a single moving source, or series of such sources, that traverse along a reasonably well defined path across the field of view. In this latter application it is desirable to track the antenna along with the target or source in order to allow or optimize reception.

Most targets of interest are moving at fairly high speed or occupy a small aperture size in the far field view of an antenna. Received signals are also very directional having a large off-axis attenuation or power drop off that is very steep beyond 10 or more degrees from center. These factors make physical motion of the antenna for real time tracking undesirable, especially for advanced communications. Physical placement and motion of the antenna for modern communications requires high precision and reproducibility, neither of which are obtainable with coarse mechanical systems. Mechanically moving an antenna with high precision is very expensive and generally too slow for modern applications.

Therefore, non-mechanical or so called inertialess designs have been developed to overcome the stringent mechanical requirements. In these designs the center of focus, or phase center of the antenna is altered using active tuning elements within the antenna horn rather than moving the horn itself.

In U.S. Pat. No. 4,387,378 of Henderson, a series of elements called paracletic elements are disposed about an antenna feed or horn and serve to alter or modulate the position of the phase center for the feed which in turn moves the focus of the antenna. However, this approach requires the control and operation of many active electrical elements through a series of diodes and related control circuitry as well as the isolated mounting of the elements. The result is both electronic and mechanical complexity which increases cost and decreases reliability.

What is needed is a simple method and design for implementing a high speed scanning antenna with minimal complexity and cost while operating very efficiently and reliably.

SUMMARY

With the above problems of the art in mind one purpose of the present invention is to provide a scanning type antenna capable of scanning in a predetermined modulation pattern.

Another purpose of the present invention is to provide a high frequency antenna capable of tracking a moving source using high frequency modulation of a focal axis.

These and other objects, advantages, and purposes are realized in an antenna structure comprising a non-magnetic, electrically conductive radiation horn coupled to a receiver or electromagnetic radiation detector which has a predetermined focal centerline or centroid. At least one magnetically switchable conductor for establishing a path of electrical conductivity is disposed within said horn. The switchable conductor is positioned substantially perpendicular to the line of focus and is spaced apart from the focal centerline a predetermined distance determined by the width of the scanning field of view. A magnetic modulator is positioned adjacent the horn so as to not interfere with received radiation and generates a magnetic field of sufficient strength at the point of the switchable conductor so as to open or close electrical contacts of the conductor at a predetermined modulation rate.

The preferred embodiment is operated by using a reed switch for the switchable conductor and employing at least two switches positioned symmetrically about the centerline of focus. The reed switches are configured as normally open switches which are closed by the magnetic field. Two electromagnets are employed, one adjacent to each reed switch. The magnets can be mounted interior of the horn although outside mounting is preferred. The focus of the antenna is altered by applied magnetic fields closing one of the switches to shift the antenna phase center toward that switch. A modulator and associated control circuit can be employed to control the application of power to the electromagnets so that the antenna focal pattern is modulated as scanned. The modulation pattern used is monitored on successive scans to interrogate the incoming signal and assure highest power direction and tracking source.

BRIEF DESCRIPTION OF THE DRAWINGS

The novel features of the present invention may be better understood from the accompanying description when taken in conjunction with the accompanying drawings in which like characters refer to like parts and in which:

FIG. 1 illustrates a perspective view of an antenna constructed according to the principles of the present invention;

FIG. 2 illustrates a sectional view of the antenna of FIG. 1 as well as the cooperation of a magnetic modulation driver and magnetic switches employed therein.

DESCRIPTION OF A PREFERRED EMBODIMENT

Figure 3:
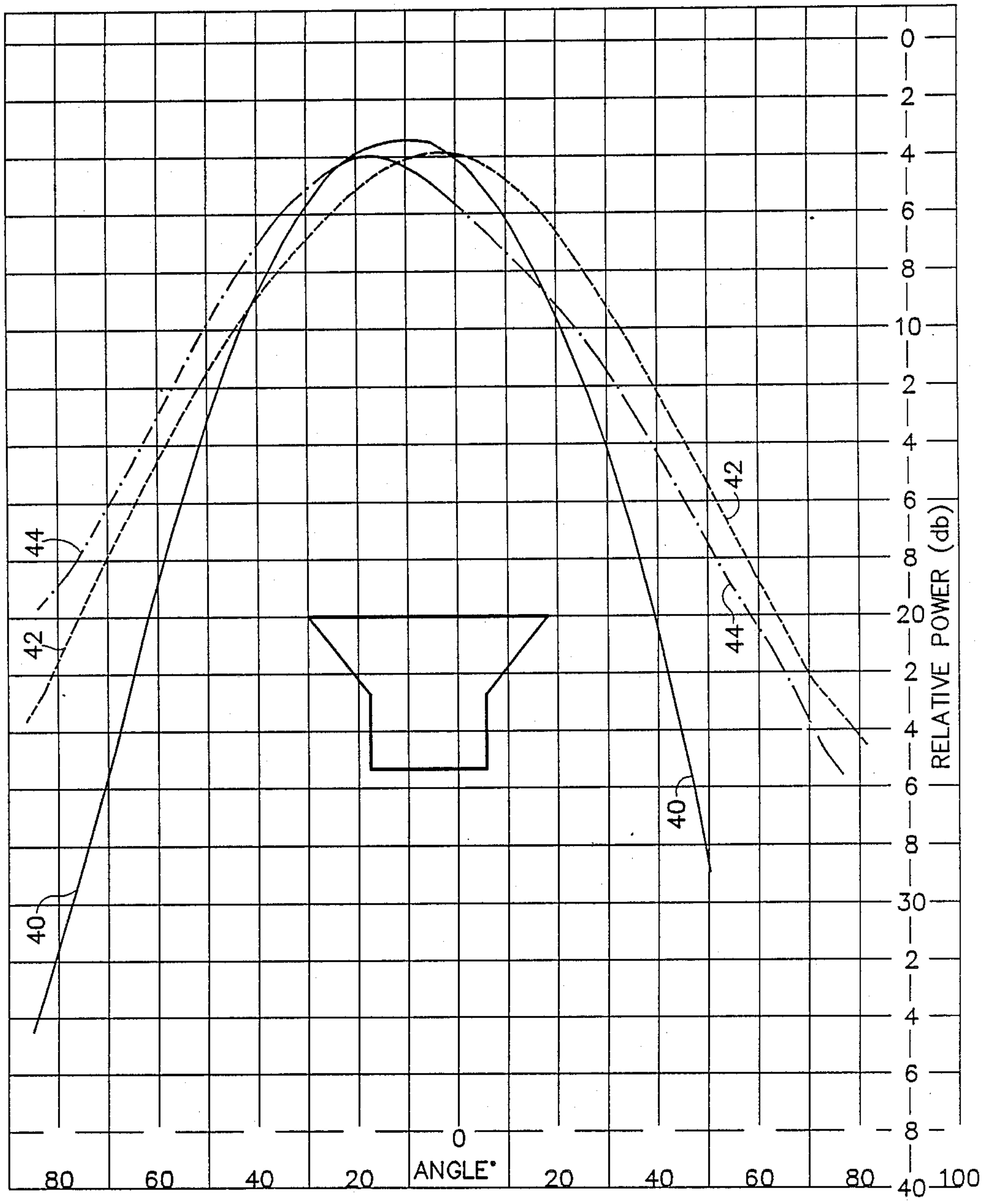
FIG. 3 graphically illustrates the direction of the central axial focus of the antenna of FIG. 1 in various operational states.

The present invention provides a method of constructing and operating an antenna structure or apparatus that allows scanning and modulation of a high frequency antenna focal axis transverse to a predetermined field of view. This allows a transmission source to be efficiently tracked as it moves across the field of view either for a fixed antenna or for an antenna that scans at a slower rate than the source velocity. This is accomplished in an apparatus that employs a high frequency rectangular horn-type antenna constructed from non-magnetic but electrically conductive material. A magnetically modulated or switched shorting path is disposed within the antenna horn and extends between at least two opposing interior sides of the horn.

An antenna constructed according to the principles of the present invention is illustrated in a perspective view in FIG. 1. In FIG. 1, an antenna 10 comprises a pyramidal or rectangular horn 12 having an open reception end 14 through which incoming electromagnetic waves enter the horn 10 and a narrower detection end or region 16 forming a focal volume where the radiation is concentrated at a higher average power density. An electromagnetic wave detector 18 (See FIG. 2) such as, but not limited to, a Klystron element is located in the narrower detection or receiver region 16.

Electromagnetic energy or waves entering the horn 12 through the reception opening 14 are focused into the detection region 16 where they interact with the detector 18 and produce an electrical output signal for processing by subsequent apparatus or electronic circuitry. Those skilled in the art of antenna design and construction will readily understand the principles and elements used to construct the antenna 10, as described, including the horn 12 and detector element 18 as well as basic electronic circuitry used to transfer an electrical signal out of the antenna 10.

The frequencies efficiently received by the antenna 10 are, of course, determined by the standing wave patterns that are supported within the dimensions of the horn 12. The horn supports wave patterns based on the separation between the sides of the horn 12 which act as ground planes that create or impose nodes in the local standing wave patterns. Frequencies whose wavelengths fit an integral number of times between the shorting surfaces are supported by the antenna. Other wavelengths will be greatly attenuated so that very little, if any, of this radiation is detected in the region 16.

For this type of antenna structure, assuming axial symmetry for the horn 12 and the position of the detector 18, the center longitudinal axis of the horn 12 represents a line of highest gain reception. That is, along the centerline or central axis of the antenna horn 12 is the position or focus along which the antenna is most sensitive and provides the highest gain for receiving signals of the appropriate frequencies. Signals originating from a source that is positioned off of this centerline are attenuated by an amount proportional to the distance off the centerline. Therefore, as discussed above, tracking a source with optimal reception strength for an incoming signal normally requires moving the physical centerline of the antenna in synchronization with the moving source. The transverse angular displacement rate of the horn centerline also depends on the distance between the antenna and the source being tracked.

As pointed out above, targets or frequency sources moving at relatively high speeds prohibit the use of mechanical designs which simply move or rotate an entire antenna assembly or the antenna horn to redirect the antenna focus. Mechanical systems are too slow to respond for modern applications, have low resolution (accuracy), and may drift, leading to problems with reproducibility. In addition, mechanical designs employ rotating or sliding connections which require special handling to maintain low attenuation coupling of received signals to other apparatus for processing. Flexible or moving connections have also proven less than satisfactory for reliability in many applications such as in portable military equipment.

A principle alternative to the mechanical technique of simply moving the entire antenna is the technique of readjusting the antenna line of focus. Previous designs have used two principle techniques to change the center of an antenna "pattern" or to change the centerline for the antenna "focus". One is to physically move the position of the main receiver or detection elements within the antenna horn and the other is to alter the standing wave or node patterns supported by the antenna horn. As discussed above, any physical relocation or movement of an antenna component responds too slow for advanced antenna designs. On the other hand, alteration of the antenna horn tuning or node characteristics can be accomplished at higher speed by placing one or more active tuning elements, such as diodes, or radiation absorbers, inside the horn structure and connecting them to special control circuits for selectively switching them on or off. However, these techniques utilize complex electronic control circuits and require the use of often complex elements requiring special mounting or electrical isolation techniques within the antenna horn. There are also some residual switching speed problems for these techniques.

In the present invention, the detector or receiver portion of the antenna remains in a physically fixed position or configuration and the antenna horn is operated without change. However, the tuning characteristics of the antenna horn are changed to vary the focus of the antenna. This tuning is accomplished using the elements illustrated in FIG. 1.

As shown in FIG. 1, at least one shorting member 20 is mounted to extend across the antenna opening inside the horn for interaction with the electromagnetic waves. If a conductive element is placed in the path of incoming radiation, it acts to establish a node at that point. This node changes the standing wave patterns allowed and effectively shifts the position of the antenna centerline or focus. However, it is undesirable to mechanically insert and remove such a shorting element during use. Instead, a control circuit is established to operate an active element that remains mounted in place. However, in the present invention this control is effected in a manner that avoids use of complex circuitry and radiation or output sensors as encountered in previous techniques. Instead, the shorting element 20 is constructed so that it presents a conductive but not shorting path during some stages of operation and a conductive shorting path during other stages of operation without direct or physical connection to a control circuit. The element 20 also does not require mechanical adjustment.

The shorting element 20 comprises a magnetically operated switch such as a well known high speed reed switch as used in the electronic arts. The contacts in this type of switch are shifted between a connect position and a break position which determines if the electrical path through the switch is shorted, conductive, or open, non-conductive and uses a magnetic field for actuation.

In the preferred embodiment, the actuation magnetic field is provided by a magnetic source such as at least one electromagnetic driver 22 mounted adjacent to the antenna horn 12. In the preferred embodiment, two switches, **20*a* and 20*b* are arranged symmetrically on opposite sides of the central line of focus, and two electromagnets 22*a* and 22*b* are used to control operation of the switches for scanning the antenna, as explained below. Each electromagnetic driver 22 is not placed inside the antenna horn 12** since that may present additional wave perturbing material which could interfere with antenna operation and focal characteristics.

The antenna horn 12 must be electrically conductive but constructed from low or non-ferromagnetic material in order to allow penetration of the magnetic field into the interior of the horn 12. The magnetic field generated by or emanating from the electromagnetic drivers 22 is used to activate the switch elements 20 and alter the position of the switch contacts. The magnetic field can be used to move the contacts from either an open or closed position depending upon the switch configuration employed. That is, whether an element 20 is configured as Normally Open, N.O., or Normally Closed, N.C., and what type of response to the magnetic field is desired.

The electromagnets or electromagnetic drivers 22 are connected to a source of power 24 through a switching or modulation control circuit 26 which is used to switch the supply of current to the electromagnet on and off in response to one or more scanning control signals. Those skilled in the art will readily understand and appreciate the types of power supplies and control circuits required, depending upon current required for the electromagnets 22 to deliver magnetic fields at the point of the switching elements 20 needed to affect switching, and whether regulation is desired. Such controls are known in the arts of electronics and electromagnets.

The current switching can be used to alter the operating state of the switching elements 20 on an occasional basis in order to shift the focus of the antenna for a relatively long period of time, or more preferably in a continual modulation pattern, according to the system requirements. The latter technique is used to modulate the focus or centerline of the antenna across a field of view for the antenna horn. For the latter technique a modulated power source, as known to those skilled in the art, is used to drive the electromagnets 22 at a desired frequency.

A sensor may be is connected to monitor the current supplied to the electromagnets 22 or, alternatively, a magnetic field sensor (not shown) such as but not limited to a Hall effect chip or wire loop, can be employed to detect the modulation pattern implemented by the switching elements 20. Using known electronic signal processing techniques, the modulation pattern can be presented as a separate modulation signal which is subtracted from the detector 18 output by a suitable demodulator 28 to produce the detected signal. This modulation is then subtracted from detected incoming signals during processing in order to generate a received electromagnetic radiation pattern or signal.

This technique has been employed on an antenna to scan a centroid pattern across a predetermined field of view. In an exemplary embodiment, two switches 20 of 3.2 inches in length extended between a first pair of opposite side walls of the antenna horn, each switch being located at a spacing of 1.8 inches from the adjacent side wall and 3.6 inches from the end of the antenna horn. An electromagnet was used to operate the switches and change the focus pattern of the antenna. The changes in focus induced in the antenna are illustrated in FIG. 3.

In FIG. 3, each curve illustrates a relative output or received power for the antenna versus direction transverse to the central mechanical axis of the antenna horn. The curve 40 in solid lines represents an undisturbed or altered centroid of the antenna when no magnetic field is applied to the switches 20 to create a shunt across the antenna horn 12. This curve represents a normal scan pattern or reception pattern for the antenna 10 and the typical fall-off of the sensitivity or receptivity of the antenna for received radiation that is off-axis.

When power is applied to the electromagnet *22a*, the switch *20a* is activated and the antenna focal pattern or centerline is shifted, as previously discussed. The resulting shift or new scanning pattern for the antenna 10 using this setting is illustrated in FIG. 3 as curve 42 in dashed lines. In FIG. 3, the curve 42 represents the variation in received power as a function of antenna axis and is offset from the curve 40 by a few degrees. The curve 42 shows a shift in the maximum power or centroid toward the physical position of the switch *20a* following switch closure. The precise offset depends on the size of the antenna horn 12 and the placement of the switching elements 20. Those skilled in the art would readily understand the adjustment of these dimensions to yield a desired scanning pattern.

On the other hand, in the exemplary embodiment, when the switch *20b* is activated, the power curve 44 is obtained for the reception focal pattern or centroid of the antenna 10. Curve 44 represents the power variation when the switch contacts for the switching element *20a* are in an open non-shorting position and the switch contacts for the switching element *20b* are in a closed or shorting position. Therefore, the curves 42 and 44 illustrate a shift in the location of the antenna focal pattern or centroid obtained for the alternate activation of the switching elements or switches *20a* and *20b* by a magnetic field. The antenna 10 is modulated using these settings and a target or field of view scanned.

The curves of FIG. 3 show that an exemplary antenna 10 was scanned over a typical field of view for an antenna system scanning a region, or for a moving source, that is positioned at high or very high altitudes above the surface of the earth. The resulting power curves clearly show an ability to modify or modulate the focal center of the antenna 10 at high speed with very low complexity or simple parts and very little interference with antenna radiation patterns.

What has been described then is a new method and apparatus for providing a scanning antenna with a minimum of parts and complexity while efficiently operating at high speeds.

The foregoing description of a preferred embodiment has been presented for purposes of illustration and description. It is not intended to be exhaustive nor to limit the invention to the precise form disclosed, and many modifications and variations are possible in light of the above teaching. The embodiments were chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What we claim as our invention is:

1. A scanning antenna, comprising:

a receiver element for detecting signals in the form of interacting with electromagentic radiation at predetermined frequencies;

an antenna horn for capturing and coupling said electromagnetic radiation to said receiver element, said horn comprising non-magnetic electrical conductive material and having a centerline of focus;

magnetically switchable electrical conductor means extending between interior sides of said horn spaced apart from and substantially perpendicular to said centerline, said conductor means being magnetically switchable between discrete electrically conductive on and non-conductive off states; and magnetic field emission means positioned adjacent a sidewall of said horn for generating a magnetic field having a strength at said conductor means sufficient to switch said conductor means between said two discrete states.

2. The scanning antenna of claim 1 further comprising field control means coupled to said magnetic field emission means for modulating magnetic field strength.

3. The apparatus of claim 1 wherein said conductor means comprises at least one magnetically operated reed relay disposed across a portion of the area intercepted by said horn in spaced apart relationship with said receiver element and having electrical contact leads extending through sidewalls of said horn.

4. The apparatus of claim 3 where the contact leads for said reed relay are electrically connected to said sidewalls.

5. The apparatus of claim 1, wherein said shunt means comprises two magnetically operated reed relays spaced on opposite sides of said centerline.

6. The apparatus of claim 1 wherein said magnetic field emission means comprises:

at least one electromagnetic coil disposed adjacent to said horn sidewall outside of said horn; and modulation means having an electrical source for powering said coil in a predetermined modulation relationship.

7. The apparatus of claim 5 further comprising demodulation means connected in a series with an output of said receiver element for removing modulation frequencies impressed on received signals by said switches.

8. An antenna structure, comprising:

a non-magnetic, electrically conductive radiation horn defining an antenna opening having a predetermined central line of focus;

detector means for detecting electromagnetic radiation coupled to the horn;

at least one magnetically switchable conductor mounted to extend across the antenna opening perpendicular to and spaced from said central line of focus, said conductor being switchable between an electrically conductive, on state and a discrete non-conductive state;

magnetic field generating means for generating a magnetic field to control switching of said conductor between said discrete conductive and non-conductive states; and control means for controlling operation of said magnetic field generating means.

9. The structure as claimed in claim 8, wherein a pair of magnetically switchable conductors are mounted in said radiation horn on opposite sides of said central line of focus.

10. The structure as claimed in claim 9, wherein said magnetic field generating means comprises a pair of electromagnets mounted outside said horn on opposite sides, each electromagnet being located adjacent a respective one of said conductors.

* * * * *